United States Patent
Schmalz et al.

(10) Patent No.: US 6,817,639 B2
(45) Date of Patent: Nov. 16, 2004

(54) UNDER PRESSURE HANDLING DEVICE

(75) Inventors: Kurt Schmalz, Dornstetten (DE);
Thomas Eisele, Fluorn-Winzeln (DE);
Gernot Schmierer, Herrenberg (DE)

(73) Assignee: J. Schmalz GmbH, Glatten (DE)

( * ) Notice: Subject to any disclaimer, the term of this patent is extended or adjusted under 35 U.S.C. 154(b) by 111 days.

(21) Appl. No.: 10/212,775

(22) Filed: Aug. 7, 2002

(65) Prior Publication Data

US 2003/0038491 A1 Feb. 27, 2003

(30) Foreign Application Priority Data

Aug. 9, 2001 (DE) .......................................... 101 40 248

(51) Int. Cl.$^7$ ............................. B25J 15/06; B25J 13/08
(52) U.S. Cl. ........................ 294/64.1; 294/907; 901/40; 901/46
(58) Field of Search ............................. 294/64.1, 64.2, 294/64.3, 65, 907; 414/627, 737, 752.1; 901/40, 46

(56) References Cited

U.S. PATENT DOCUMENTS

| | | | |
|---|---|---|---|
| 4,252,497 A | | 2/1981 | Burt |
| 4,793,657 A | * | 12/1988 | Mense .......................... 294/65 |
| 5,244,242 A | * | 9/1993 | Goedecke et al. .......... 294/64.2 |
| 5,325,880 A | * | 7/1994 | Johnson et al. ................. 137/1 |
| 5,609,377 A | * | 3/1997 | Tanaka ........................ 294/65 |
| 6,024,529 A | * | 2/2000 | Kristensen ................... 414/607 |
| 6,065,789 A | * | 5/2000 | Nagai et al. ................ 294/64.1 |
| 6,131,973 A | * | 10/2000 | Trudeau et al. ................ 294/65 |

* cited by examiner

Primary Examiner—Dean J. Kramer
(74) Attorney, Agent, or Firm—Paul Vincent

(57) ABSTRACT

Under pressure handling device comprising an under pressure generator, a device for controlling the under pressure and several grippers which engage on a work piece to be handled, wherein each gripper is provided with a device for controlling the under pressure, a sensor for detecting state variables on the gripper and an evaluation electronics to which the device for controlling the under pressure and the sensor are connected.

9 Claims, 1 Drawing Sheet

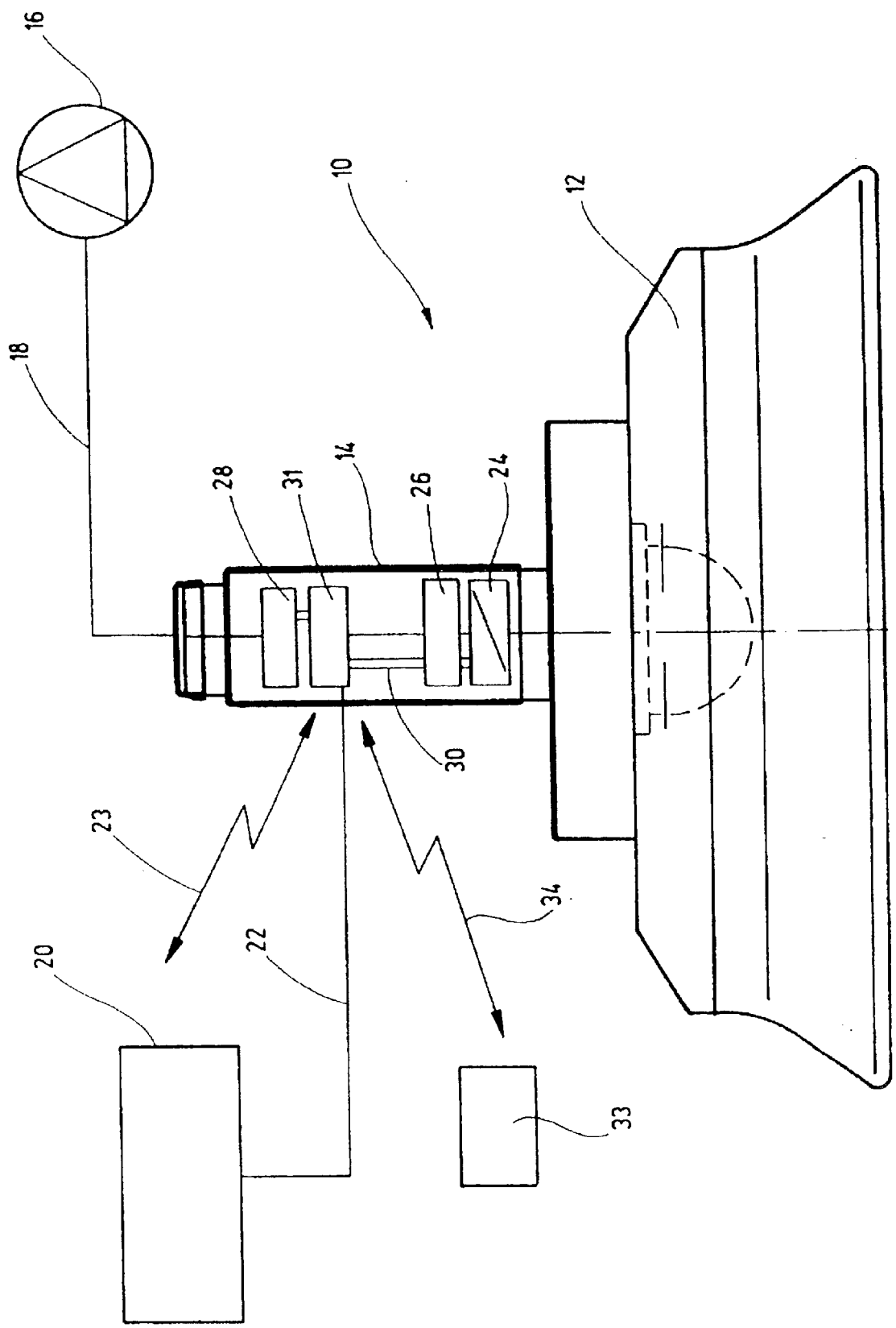

UNDER PRESSURE HANDLING DEVICE

BACKGROUND OF THE INVENTION

The invention concerns an under pressure handling device comprising an under pressure generator, a means for controlling the under pressure and several grippers which grasp a work piece to be handled.

An under pressure handling device usually comprises a vacuum generator, valve technology for controlling the vacuum, sensor technology for monitoring the vacuum and at least one pneumatic surface gripper. Systems of this type are used for manual handling of general cargo and in automation technology.

In automation technology, each suction gripper is separately controlled via a central control and regulating means. This requires enormous effort to network the components and also produces high susceptibility to defects.

The costs involved in the construction of this under pressure handling device depend mainly on the selection of the vacuum generator. If a surface gripper consists e.g. of k individual grippers, the vacuum generating system must be designed such that all k individual grippers can be evacuated.

For leak-tight materials, selection of a suitable vacuum generator is simple and is based on the size of the volume to be evacuated and the retention force to be produced.

The design considerations are more difficult when it cannot be anticipated with certainty whether or not all k individual grippers are in contact with the object to be gripped during the gripping process. If e.g. I individual grippers are not in contact with the object to be gripped during the gripping process, only m=k-I grippers are involved in the transmission of force. A further critical point in this connection is the fact that the vacuum generator must evacuate both m individual grippers as well as the external air from I unoccupied grippers. This fact can cause failure of the overall system depending on the suction power of the vacuum generator.

When the material is leaky or porous, the above-described situation causes substantially greater problems since a large amount of leaking air must be removed by suction even under optimum conditions when all k individual grippers are involved in the transmission of force.

In accordance with current prior art, the above-described problems are counteracted using mechanical valves or apertured diaphragms as flow resistances to limit the leaking air flow associated with an unoccupied suction gripper.

The apertured diaphragm is the simplest form of flow resistance. This flow resistance is generated by a small opening which limits the air flow. Apertured diaphragms are e.g. installed directly into the fitting of a suction gripper. Apertured diaphragms are simple mechanical components which cannot be controlled nor changed. For this reason, they are relatively inexpensive and require little space. Disadvantageously, the suction air flow is always limited even when a leak-tight suction gripper is to be evacuated, the air flow cannot be controlled, and leaking air is always suctioned when the suction gripper is not occupied.

Conventional contact valves are mechanical valves which open only upon contact with the object to be grasped. They are advantageous in that no leaking air is suctioned when the suction gripper is not occupied. However, disadvantageously, they only function with flat components. Flow valves are also known and are usually ball seat valves. When the volume flow is high, a ball is pressed in the flow direction and against a seal by means of the suction volume flow to close the suction channel. If the gripper is placed onto a leak-tight surface, a bypass bore inside the flow valve provides pressure compensation between vacuum system and inner space of the suction gripper. The ball moves back into its initial position and the full suction cross-section is available. These valves have the advantage that the leaking air is limited during free suction and the suction air flow is larger when suction is completed than is the case with a pure apertured diaphragm. This is advantageous for porous materials. Disadvantageously, these valves cannot be controlled and produce a leaking air flow when the suction gripper is not occupied.

The vacuum generators of a vacuum system having pneumatic surface grippers must always be oversized, since each individual suction gripper cannot be properly controlled. This produces high operating costs.

Due to the oversizing of the vacuum generators, the connection lines to the actual gripper system must also be oversized, which produces extreme limits for use in automation technology. Robots e.g. are not designed for guiding corresponding suction tubes along their moving parts.

The largely centrally controlled vacuum monitoring uses vacuum switches and is not suitable for system monitoring. For example, a blocked feed line to one of the suction grippers produces a correct vacuum value in the system although the gripper no longer functions.

It is therefore the underlying purpose of the present invention to provide an under pressure handling device for producing the momentarily required under pressure using minimum operating energy.

SUMMARY OF THE INVENTION

This object is achieved in accordance with the invention in an under pressure handling device of the above-mentioned type in that each gripper is provided with a means for controlling the under pressure, a sensor for detecting the operational conditions on this gripper and evaluation electronics to which the means for controlling the under pressure and sensor are connected.

In the inventive under pressure handling device, each gripper has a self-contained unit which, with central pressure supply, must only be supplied with under pressure. Alternatively, each gripper could have its own under pressure supply (e.g. ejector) such that only electrical energy must be supplied to the gripper. An under pressure handling device of this type can be used in a straightforward manner for automated processing equipment, since disruptive line connections are no longer required. The required space is reduced to a minimum.

A miniaturized pressure sensor, a miniaturized valve and, optionally, miniaturized evaluation electronics and a miniaturized communication unit can be integrated into an intelligent microsystem. This latter embodiment has the additional advantage that the system intelligence is decentralized, thereby reducing the number of cables or communication interfaces. In the inventive under pressure handling device, decentralized in-situ pressure measurements and controls and/or regulations are implemented. These systems are also easier to maintain.

In a further development, the gripper has telematic capabilities such as e.g. logging, remote diagnosis, remote maintenance etc.

The invention permits optimized use of the vacuum generators. Only vacuum grippers which are involved in force transmission are connected to the vacuum generator and no leaking air is suctioned. Moreover, the line cross-sections are reduced to dimensions which are suitable for robots and automated equipment.

In-situ pressure measurement together with valve technology produces reliable measurement results and intelligent component portions.

In a further development, the miniaturized, intelligent sensor valve unit for vacuum applications can be connected to the Internet (Ethernet, PCO-IP) which offers unlimited possibilities for telematics, such as parameterization of the gripper system via NETSCAPE/EXPLORER on the basis of an XML (=extended mark-up language (structured HTML)) hardware profile, logging of gripper parameters, preventive maintenance triggered by a change in measured system parameters such as e.g. pressure loss during service life, etc.

The increase in flexibility of the surface suction grippers is advantageous since only the required suction grippers switch themselves on independently and automatically.

Optimum flexibility of the overall system is produced through miniaturization of the components as well as use of standard components to thereby reduce costs. The valve sensor unit can be retrofitted such that the conventional systems can be easily modified. IT standards (Ethernet, XML, etc.) can also be used.

Subminiaturized bistable 3/2 magnetic valves (Lee Company, Westbrook, Conn., USA) can be used. The power consumption is 2.8 mWs per switching cycle. The diameter is 7.14 mm and the length is 28.5 mm. The flow at 0.7 bars is 6 Nl/min (1,100 Lohms). The pressure range is between 0 and 1 bar. The standard voltage supply is 5 V or 24 V.

In another embodiment, valves from TiNi Alloy Company, San Leandro, Calif., USA, can be used. These valves are sub-miniature and are based on thin film, shape memory alloy technology. They can be controlled proportionally. The power consumption is 200 mW, the dimensions of the valve unit are 8×5×2 mm, and the outer dimensions are 16×9.4×8 mm. The flow at 2 bars (pressure difference) is 1 Nl/min. The pressure range is between 0 and ca. 6 bars. The ambient operating temperature is <40° C.

The sensor has a pressure range between 0 and 1 bar and a minimum power input. As mentioned above, the valve is a 3/2 way valve or, optionally, a 2/2 way valve.

In an embodiment of the Invention, the sensor is an under pressure sensor, a sensor for detecting a flow rate or flow speed, a force sensor, a momentum sensor, an optical sensor sensing an occupation of the gripper, a camera, a temperature sensor, a surface detector for detecting a structure of a surface of the work piece, a weight sensor, a wear detector, an accelerator sensor, a distance sensor or a mechanical occupation sensor.

Further advantages, features and details of the invention can be extracted from the dependent claims and the following description which shows the cross-section of a particularly preferred embodiment with reference to the drawing. The features shown in the drawing and mentioned in the claims and in the description may be essential to the invention either individually or collectively in any arbitrary combination.

BRIEF DESCRIPTION OF THE DRAWING

The sole FIGURE illustrates the gripping in accordance with the invention.

DESCRIPTION OF THE PREFERRED EMBODIMENT

The drawing shows a gripper (reference numeral 10) which is used for grasping objects. Clearly, the invention is not limited to the grippers 10 shown in the drawing but can be used with any embodiment of grippers. The gripper 10 is part of a plurality of under pressure handling devices comprising grippers. The gripper 10 is formed by a flat suction gripper 12 and a fitting 14 mounted thereto and by means of which the flat suction gripper 12 is provided with under pressure. In the embodiment shown in the drawing, this under pressure is generated centrally in an under pressure generator 16 and is supplied to the fitting 14 via a line 18. A control/regulating center 20 is common to all grippers 10 and is connected to the fitting 14 via a line 22.

A means 24 for controlling the under pressure, a sensor 26 for detecting the state variables of the gripper 10 and an evaluation electronics 28 are located inside the fitting 14. The means 24 for controlling the under pressure, the sensor 26 for detecting the state variables of the gripper 10 and the evaluation electronics 28 are interconnected via a line 30. The means 24 for controlling the under pressure comprises an electrovalve (solenoid valve) to open and close a connection between the under pressure supply and the flat suction gripper 12. The electrovalve is controlled in dependence on the data of the sensor 26 which is, for example, a pressure sensor. This data is processed by the evaluation electronics 28 to control the electrovalve. Maintenance information can also be triggered via the evaluation electronics 28.

The components of the fitting 14 are supplied with power via the line 22 and information can also be exchanged. The gripper 10 can be monitored via Internet or Intranet, or the evaluation electronics 28 can receive or transmit information. Instead of the line 22, wireless information exchange (arrow 23) between the control/regulation unit 20 and the components of the fitting 12 is also possible.

The drawing also indicates an evaluation electronics 28 coupling to a communication interface 31 via which the information can be exchanged through line 22 or in a cordless manner (arrow 23). The communication interface 31 can also be radio-connected (arrow 34) to a visualization and programming device 33. The device 33 can be e.g. a palmtop or the like. This device 33 can display and set or adjust the state variables of the gripper 10.

What is claimed is:

1. An under pressure device for handling a work piece, the device comprising:
   an under pressure generator;
   at least one gripper to engage the work piece to be handled;
   a separate under pressure regulation means disposed on each one of said at east one gripper to control an under pressure of that gripper, each of said under pressure regulation means communicating with said under pressure generator, wherein each of said under pressure regulation means comprises a means for controlling at least one of an under pressure and a volume flow of that gripper on which it is disposed, a sensor for detecting operating conditions of that gripper, and an evaluation electronics communicating with said controlling means and said sensor to control at least one of said under pressure and said volume flow in dependence on said operating conditions as detected by said sensor, wherein said under pressure controlling means, said sensor, and said evaluation electronics of each said gripper are accommodated in a vacuum fitting directly connected to that gripper.

2. The under pressure handling device of claim 1, wherein said under pressure controlling means is one of a bistable electrovalve and a solenoid valve.

3. The under pressure handling device of claim 1, wherein said under pressure controlling means is a valve incorporating thin film, shape memory alloy technology.

4. The under pressure handling device of claim 1, wherein said sensor is one of an under pressure sensor, a sensor for detecting a flow rate or flow speed, a force sensor, a momentum sensor, an optical sensor sensing an occupation of that gripper, a camera, a temperature sensor, a surface detector for detecting a structure of a surface of the work piece, a weight sensor, a wear detector, an acceleration sensor, a distance sensor and a mechanical occupation sensor.

5. The under pressure handling device of claim 1, wherein said evaluation electronics has at least one of a field-bus-compatible communication unit, an IT standard compatible communication unit, and an Ethernet compatible communication unit.

6. The under pressure handling device of claim 1, wherein said vacuum fitting can be retrofitted.

7. The under pressure handling device of claim 1, wherein said vacuum fitting has one of a power supply and a connection to a power supply.

8. The under pressure handling device of claim 1, further comprising an external control/regulating center communicating with said evaluation electronics.

9. The under pressure handling device of claim 8, wherein said communication between said regulating center and said evaluating electronics is effected in a wireless manner.

* * * * *